United States Patent
Higashi et al.

(10) Patent No.: US 8,187,522 B2
(45) Date of Patent: May 29, 2012

(54) METHOD AND APPARATUS FOR PRODUCING A THREE-DIMENSIONALLY SHAPED OBJECT, AND THREE DIMENSIONALLY SHAPED OBJECT

(75) Inventors: Yoshikazu Higashi, Moriyama (JP); Masataka Takenami, Kadoma (JP); Satoshi Abe, Moriguchi (JP); Isao Fuwa, Kadoma (JP); Norio Yoshida, Kitakatsuragi-gun (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 176 days.

(21) Appl. No.: 12/461,599

(22) Filed: Aug. 18, 2009

(65) Prior Publication Data

US 2010/0044547 A1 Feb. 25, 2010

(30) Foreign Application Priority Data

Aug. 22, 2008 (JP) ................. 2008-214202

(51) Int. Cl.
*B29B 17/00* (2006.01)
*B29C 35/08* (2006.01)
*B29C 41/02* (2006.01)
(52) U.S. Cl. .................... 264/497; 264/37.14
(58) Field of Classification Search .............. 264/37.14, 264/460, 497
See application file for complete search history.

(56) References Cited

U.S. PATENT DOCUMENTS

| 5,017,753 | A | * | 5/1991 | Deckard | 264/497 |
|---|---|---|---|---|---|
| 6,066,285 | A | * | 5/2000 | Kumar | 264/439 |
| 6,657,155 | B2 | * | 12/2003 | Abe et al. | 219/121.6 |
| 2004/0021256 | A1 | * | 2/2004 | DeGrange et al. | 264/497 |
| 2004/0084814 | A1 | * | 5/2004 | Boyd et al. | 264/497 |

FOREIGN PATENT DOCUMENTS

JP 2006124732 A 5/2006

OTHER PUBLICATIONS

The Chinese Office Action dated Nov. 30, 2011 and English translation thereof, 9 pages total.

* cited by examiner

*Primary Examiner* — Leo B Tentoni
(74) *Attorney, Agent, or Firm* — Bacon & Thomas, PLLC

(57) ABSTRACT

A method for producing a three-dimensionally shaped object, includes the steps of: (i) forming a solidified layer by irradiating a light beam on a specified portion of a powder layer placed on a shaping table to sinter or melt the specified portion; (ii) forming another solidified layer by placing a new powder layer on the solidified layer thus obtained, and irradiating the light beam on a specified portion of the new powder layer to sinter or melt the specified portion of the new powder layer; and (iii) repeating the step (ii) to produce a three-dimensionally shaped object. When performing the steps (i) to (iii) within a chamber, at least a part of an ambient gas in the chamber is exhausted from the chamber through a gas passage of a shaping tank.

6 Claims, 12 Drawing Sheets

METHOD AND APPARATUS FOR PRODUCING A THREE-DIMENSIONALLY SHAPED OBJECT, AND THREE DIMENSIONALLY SHAPED OBJECT

FIELD OF THE INVENTION

The present invention relates to a method for producing a three-dimensionally shaped object, an apparatus for producing the same, and a three-dimensionally shaped object. More specifically, the present invention pertains to a method for producing a three-dimensionally shaped object having a plurality of solidified layers laminated one above another by repeating the step of irradiating a light beam on a specified portion of a powder layer to form a solidified layer, an apparatus for producing a three-dimensionally shaped object, and a three-dimensionally shaped object thus produced.

BACKGROUND OF THE INVENTION

Conventionally, there is known a method for producing a three-dimensionally shaped object by irradiating a light beam on a powdery material, which method is usually referred to as "Selective Laser Sintering or Melting". In this method, the three-dimensionally shaped object is produced by repeating (i) a step of irradiating a light beam on a specified portion of a powder layer to sinter or melt the same into a solidified layer and (ii) a step of placing a new powder layer on the solidified layer and irradiating the light beam on a specified portion of the new powder layer to form another solidified layer (see, e.g., Japanese Patent Laid-open Publication Nos. H1-502890 and 2000-73108). In case where a metal powder is used as the powdery material, the three-dimensionally shaped object thus produced can be used as a mold for molding a plastic article. In the event that a resin powder is used as the powdery material, the three-dimensionally shaped object thus produced can be used as a plastic article. This production method enables a three-dimensionally shaped object of complex shape to be produced within a short period of time.

In order to avoid oxidization of the three-dimensionally shaped object, the production thereof is performed within a chamber kept in a specified inert atmosphere. Installed inside the chamber are a powder layer forming unit, a shaping table on which the powder layer and/or the solidified layer are placed, and so forth. A light beam irradiating unit is installed outside the chamber. The light beam emitted from the light beam irradiating unit is irradiated on a specified portion of the powder layer through a light transmissive window of the chamber. For example, as can be seen in FIGS. 1 and 13, the chamber 50 is provided with a light transmissive window 52 through which the light beam L can be irradiated into the chamber 50.

When the light beam is irradiated on a powder layer to sinter or melt a powder, smoke-like substances called fumes 60 (e.g., a metal vapor or a resin vapor) are generated from the beam-irradiated portion as shown in FIG. 1. The fumes move upwards to adhere to the light transmissive window or burn, which may reduce the light beam transmittance of the light transmissive window. Reduction in the light beam transmittance makes it impossible to obtain a desired solidified layer and to produce an intended shaped object. In case where a metal powder layer is used as the powder layer, the reduced light beam transmittance results in failure to stabilize sintering or inability to increase sintering density. This poses a problem in that the three-dimensionally shaped object shows a decrease in strength.

In addition, the fumes may directly affect the light beam irradiated into the chamber. More specifically, the fumes may move upwards and may sometimes interrupt the light beam path, thereby reducing the irradiation amount of light beam (namely, the amount of light beam irradiated on the powder layer). In other words, there is a fear that, due to the interruption of the light beam path by the upwardly moving fumes, the energy quantity of light beam delivered to the powder layer may be substantially smaller than a specified value.

SUMMARY OF THE INVENTION

In view of the above, the present invention provides a method for producing a three-dimensionally shaped object, which is capable of suppressing the influence of fumes as far as possible.

In accordance with an aspect of the present invention, there is provided a method for producing a three-dimensionally shaped object, including the steps of:

(i) forming a solidified layer by irradiating a light beam (e.g., a directive energy beam such as a laser beam or the like) on a specified portion of a powder layer placed on a shaping table to sinter or melt the specified portion;

(ii) forming another solidified layer by placing a new powder layer on the solidified layer thus obtained, and irradiating the light beam on a specified portion of the new powder layer to sinter or melt the specified portion of the new powder layer, and (iii) repeating the step (ii) to produce a three-dimensionally shaped object, wherein, when performing the steps (i) to (iii) within a chamber, at least a part of an ambient gas in the chamber is exhausted from the chamber through a gas passage of a shaping tank.

In the production method of the present invention, it is preferred that the ambient gas is exhausted through a gas passage of the shaping table and at least a part of fumes is sucked and removed from the chamber.

The present production method is characterized in that the fumes are removed from within the chamber without permitting the fumes to move high upwards. In other words, one of the features of the present production method resides in that the ambient gas existing below a fume generation point is exhausted. The term "fumes" used herein means smoke-like substances (e.g., a metal vapor originating from a metal powder material or a resin vapor originating from a resin powder material) generated from the powder layer and/or the solidified layer on which the light beam is irradiated.

The term "shaping tank" used herein essentially means a vessel in which the shaped object is produced and designates, e.g., a container including a shaping table 20 and a tank wall 27 provided to surround the shaping table 20 as shown in FIG. 5.

The term "gas passage" used herein essentially means a passageway (e.g., an opening portion) through which the ambient gas (particularly, the ambient gas containing fumes) can pass. The term "fluid communication" used herein essentially means a connection state that allows a liquid or a gas to pass.

The term "powder layer" used herein designates, e.g., either a metal powder layer or a resin powder layer. The term "specified portion of a powder layer" essentially refers to a region that delineates a three-dimensionally shaped object to be produced. If a light beam is irradiated on the powder existing in the specified portion, the powder is sintered or molten into a three-dimensionally shaped object. The term "solidified layer" essentially denotes a sintered layer in case where the powder layer is a metal powder layer and signifies a cured layer in case where the powder layer is a resin powder layer.

In one preferred embodiment, the powder layer and/or the solidified layer are formed on a substrate provided on the shaping table and at least a part of the ambient gas is exhausted (e.g., sucked and removed) through a gas passage of the substrate. In other words, the fumes are sucked and removed through the gas passage of the shaping table and the gas passage of the substrate, both of which are in fluid communication with each other.

The ambient gas may be exhausted through a gas passage formed in the solidified layer. In other words, the fumes are sucked and removed through the gas passage of the solidified layer, the gas passage of the shaping table and the gas passage of the substrate, all of which are in fluid communication with one another. The gas passage of the solidified layer can be formed by controlling the light beam scanned on the powder layer.

The solidified layer may include a porous portion by controlling the light beam, in which case the ambient gas may be exhausted through the porous portion of the solidified layer. In other words, the fumes are sucked and removed through and the porous portion of the solidified layer, the gas passage of the shaping table and the gas passage of the substrate, all of which are in fluid communication with one another. The porous portion of the solidified layer can be formed by controlling the energy of the light beam irradiated on the powder layer. In this case, the porous portion of the solidified layer may be formed to close the gas passage of the substrate. In other words, the portion of the solidified layer existing at least in the partial region but not the full region above the gas passage of the substrate may be made porous.

In one preferred embodiment, at least two gas passages are formed in the substrate, a gas being supplied into the chamber through one of the gas passages while at least a part of the ambient gas (preferably, the ambient gas containing fumes) being exhausted through the other. In this case, at least two gas passages are also formed in the shaping table and are brought into fluid communication with the gas passages of the substrate.

In the production method of the present invention, the ambient gas (particularly, the ambient gas containing fumes) exhausted may be subjected to dust collection processing and then returned into the chamber. In other words, the gas from which the fumes are removed may be reused as the ambient gas in the Selective Laser Sintering or Melting.

The present invention is also directed to a three-dimensionally shaped object obtained in the afore-mentioned production method. The three-dimensionally shaped object can be used as a mold and is characterized in that at least a part of the gas passages formed in the solidified layer is used as a coolant passage of the mold (e.g., as a mold temperature controlling water passage). In other words, the gas passages formed in the solidified layer are used as fume passages during the course of producing the shaped object and as coolant passages after production of the shaped object.

In accordance with another aspect of the present invention, there is provided an apparatus for producing a three-dimensionally shaped object, which is used in performing the production method set forth above. The apparatus for producing a three-dimensionally shaped object includes:

a powder layer forming unit for forming a powder layer;

a light beam irradiation unit for irradiating a light beam on a specified portion of the powder layer to form a solidified layer;

a shaping table on which the powder layer and/or the solidified layer are formed; and a chamber for accommodating the powder layer forming unit and the shaping table therein, wherein the shaping table is provided with at least one gas passage through which to exhaust or supply an ambient gas from or into the chamber, the gas passage being connected to a gas suction unit or a gas supply unit through a pipeline.

In one preferred embodiment, a substrate is arranged on the shaping table, the substrate being provided with at least one gas passage through which to exhaust or supply the ambient gas from or into the chamber. The gas passage of the shaping table and the gas passage of the substrate remain in fluid communication with each other. In other words, the ambient gas existing within the chamber is exhausted out of the chamber through the gas passage of the substrate and the gas passage of the shaping table.

With the present invention, the fumes generated by the irradiation of light beam are effectively removed from the chamber. This makes it possible to prevent the light transmissive window of the chamber from becoming opaque. In other words, it is possible to prevent reduction in the transmittance of the light beam irradiated into the chamber, which makes it possible to obtain a desired solidified layer. More specifically, it is possible to avoid the failure to stabilize sintering or the inability to increase the density of a sintered portion, which would otherwise occur when the powder layer is a metal powder layer and the solidified layer is a sintered layer. This makes it possible to keep substantially uniform the strength of the three-dimensionally shaped object.

With the present invention, the fumes are sucked and removed downwards from the vicinity of a fume generation point. This restrains the fumes from moving upwards. Therefore, there is no possibility that the light beam path is interrupted by the fumes and that the irradiation amount of the light beam irradiated on the powder layer is reduced. In other words, it is possible to prevent reduction in the light beam energy which would otherwise be caused by the upward movement of fumes. In addition, the fumes are removed from the chamber as soon as they are generated. Thus the dirt originating from the fumes is prevented from adhering to the inner wall portion of the chamber. This provides an advantageous effect in that the chamber can enjoy improved maintainability.

DETAILED DESCRIPTION OF THE PREFERRED EMBODIMENTS

Hereinafter, preferred embodiments of the present invention will be described in detail with reference to the accompanying drawings.

(Selective Laser Sintering or Melting)

Figure 2:
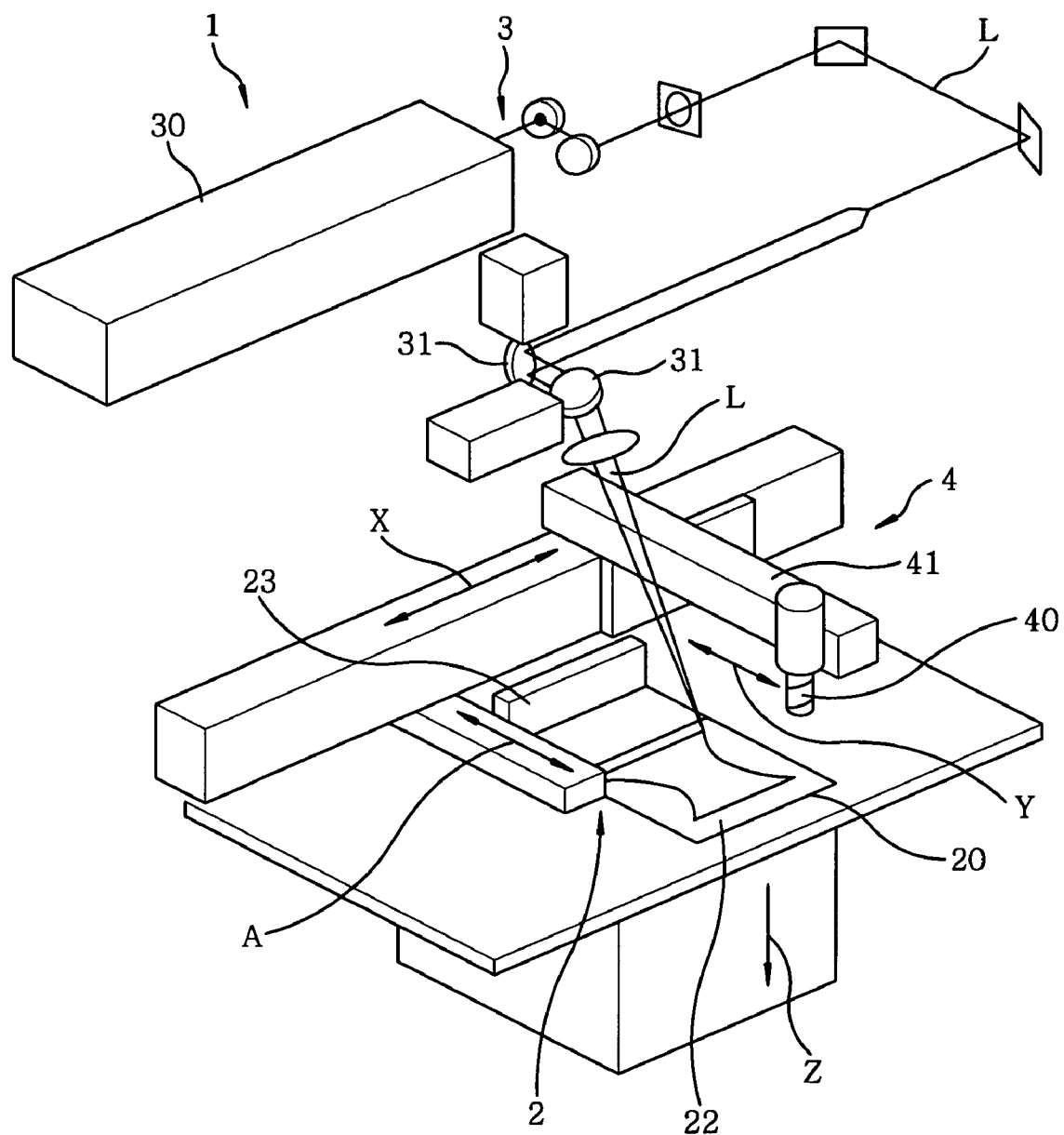
FIG. 2 is a perspective view schematically showing the configuration of a combined optical shaping machine used in performing Selective Laser Sintering or Melting.
Figure 4A:
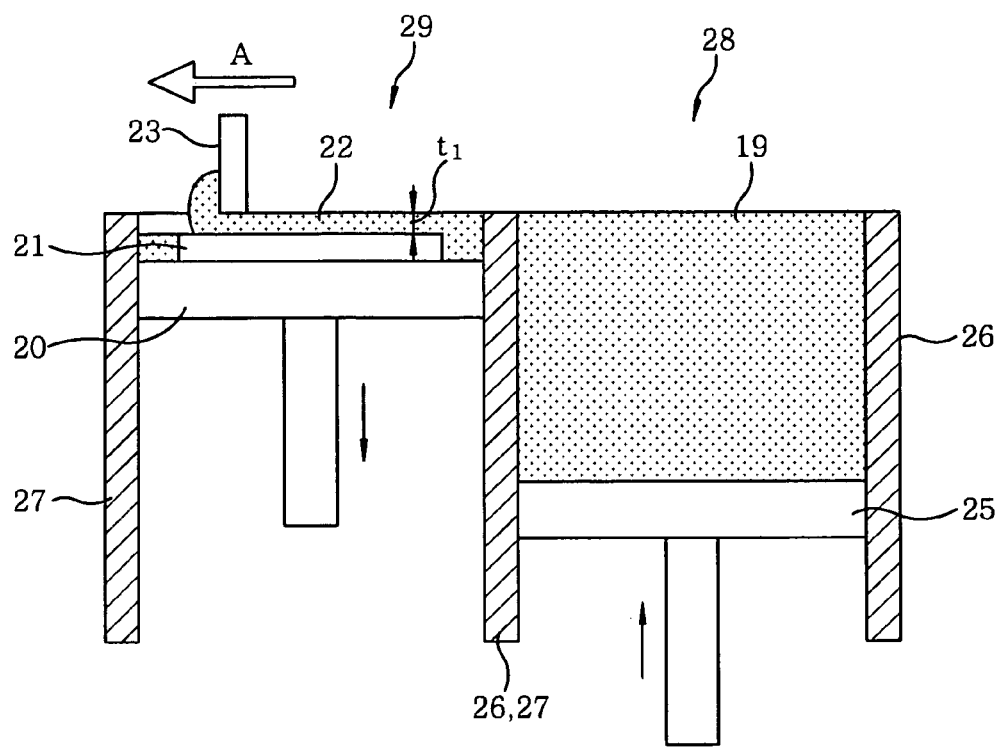
FIGS. 4A and 4B are section views schematically showing the operation of the combined optical shaping machine.
Figure 4B:
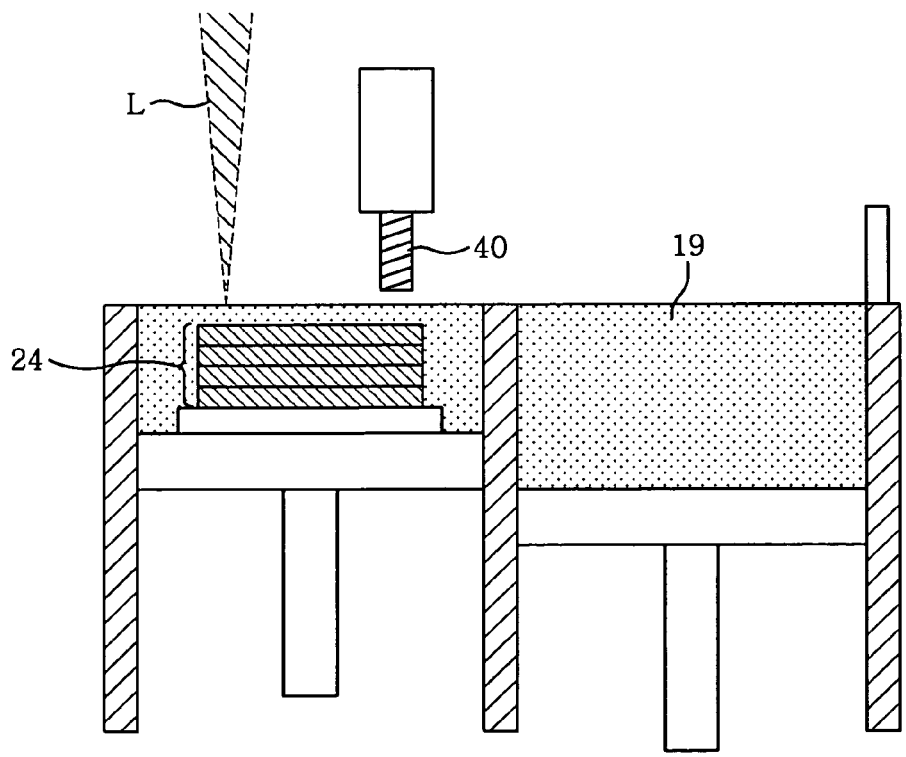

Description will be first made on Selective Laser Sintering or Melting as a premise of the present production method. FIG. 2 shows the configuration of a combined optical shaping machine 1 for use in performing Selective Laser Sintering or Melting. The combined optical shaping machine 1 mainly includes a powder layer forming unit 2 for forming a powder layer by spreading a powder such as a metal powder or a resin powder in a specified thickness, a shaping table 20 (see FIGS. 4A and 4B) vertically movable by the operation of a cylinder within a shaping tank 29 whose outer periphery is surrounded by a wall 27, a light beam irradiation unit 3 for irradiating a light beam L on an arbitrary position, and a cutting unit 4 for cutting the peripheral portion of a shaped object. As shown in FIGS. 4A and 4B, the powder layer forming unit 2 mainly includes a powder table 25 vertically movable by the operation of a cylinder within a powdery material tank 28 whose outer periphery is surrounded by a wall 26, a substrate 21 arranged on the shaping table 20 and serving as a base of the shaped object, and a squeezing blade 23 for forming a powder layer 22 on the substrate 21. Referring back to FIG. 2, the light beam irradiation unit 3 mainly includes a light beam oscillator 30 for generating a light beam L (e.g., a directive energy beam such as a laser beam or the like) and a galvano-mirror 31 (or a scanning optical system) for scanning the light beam L on the powder layer 22. If necessary, the light beam irradiation unit 3 may further include a beam shape correction unit for correcting the shape of a light beam spot (namely, a unit including, e.g., a pair of cylindrical lenses and a rotary driver for causing the lenses to rotate about the axis of the light beam L) and an fθ lens. The cutting unit 4 mainly includes a milling head 40 for cutting the peripheral portion of a shaped object and an XY drive unit 41 for moving the milling head 40 to a cutting position.

Figure 3:
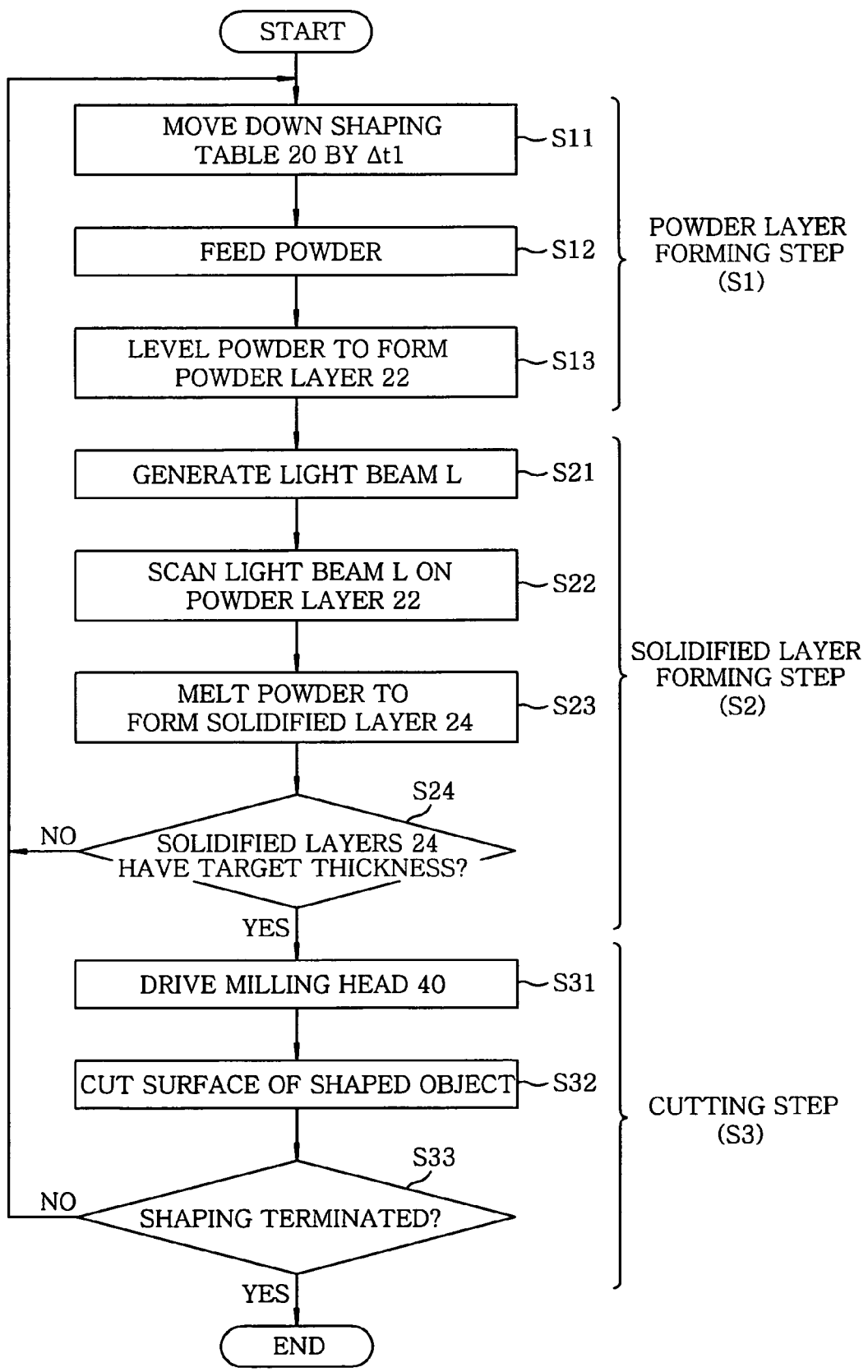
FIG. 3 is a flowchart illustrating the operation of the combined optical shaping machine.

The operation of the combined optical shaping machine 1 will now be described in detail with reference to FIGS. 3, 4A and 4B. FIG. 3 illustrates the operation flow of the combined optical shaping machine 1 and FIGS. 4A and 4B schematically show the operation of the combined optical shaping machine 1.

The operation of the combined optical shaping machine 1 mainly includes a powder layer forming step (S1) for forming a powder layer 22, a solidified layer forming step (S2) for forming a solidified layer 24 by irradiating a light beam L on a specified portion of the powder layer 22 and a cutting step (S3) for cutting a surface of a shaped object. In the powder layer forming step (S1), the shaping table 20 is first lowered by Δt1 (S11). Then the powder table 25 is moved up by Δt1. Thereafter, as shown in FIG. 4A, the squeezing blade 23 is moved in the direction indicated by an arrow A, whereby the powder placed on the powder table 25 (e.g., an iron powder having an average particle size of 5 µm to 100 µm or a powder of nylon, polypropylene or ABS resin having an average particle size of 30 µm to 100 µm) is transferred onto the substrate 21 (S12) and is leveled to form a powder layer 22 with a predetermined thickness Δt1 (S13). Next, the operation flow proceeds to the solidified layer forming step (S2) in which a light beam L (e.g., a carbon dioxide laser beam or an ultraviolet ray beam) is generated from the light beam oscillator 30 (S21) and is scanned on an arbitrary position of the powder layer 22 through the use of the galvano-mirror 31 (S22). Thus the powder is melted and solidified to form a solidified layer 24 united with the substrate 21 (S23).

The powder layer forming step (S1) and the solidified layer forming step (S2) are repeated until the thickness of the solidified layers 24 laminated one above another reaches a target thickness calculated from, e.g., the tool length of the milling head 40 (see FIG. 4B). The newly laminated solidified layer is united with the previously formed lower solidified layer in the sintering and melt-solidifying process.

If the thickness of the solidified layers 24 thus laminated becomes equal to the target thickness (S24), the operation flow proceeds to the cutting step (S3) in which the milling head 40 is driven (S31). In an instance where the tool (ball end mill) of the milling head 40 is 1 mm in diameter and 3 mm in effective blade length, the milling head 40 is capable of performing a cutting work in a depth of 3 mm. Assuming that the Δt1 is 0.05 mm, the milling head 40 is driven at the time when sixty solidified layers have been formed. The milling head 40 is moved by the XY drive unit 41 in the directions indicated by arrows X and Y, thereby cutting the surface of a shaped object formed of the laminated solidified layers 24 (S32). If the production process of a three-dimensionally shaped object is not completed as yet (S33), the operation flow returns back to the powder layer forming step (S1). Thereafter, the steps S1 through S3 are repeated to laminate additional solidified layers 24, thereby completing the production of the three-dimensionally shaped object.

The irradiation route of the light beam L in the solidified layer forming step (S2) and the cutting route in the cutting step (S3) are preset based on the three-dimensional CAD data. At this time, the processing routes are determined by applying a contour work. In the solidified layer forming step (S2), for example, use is made of the contour shape data of the respective cross-sections obtained by slicing, at an equal pitch (e.g., at a pitch of 0.05 mm if the Δt1 is 0.05 mm), STL data originating from a three-dimensional CAD model.

(Production Method of the Present Invention)

Figure 1:
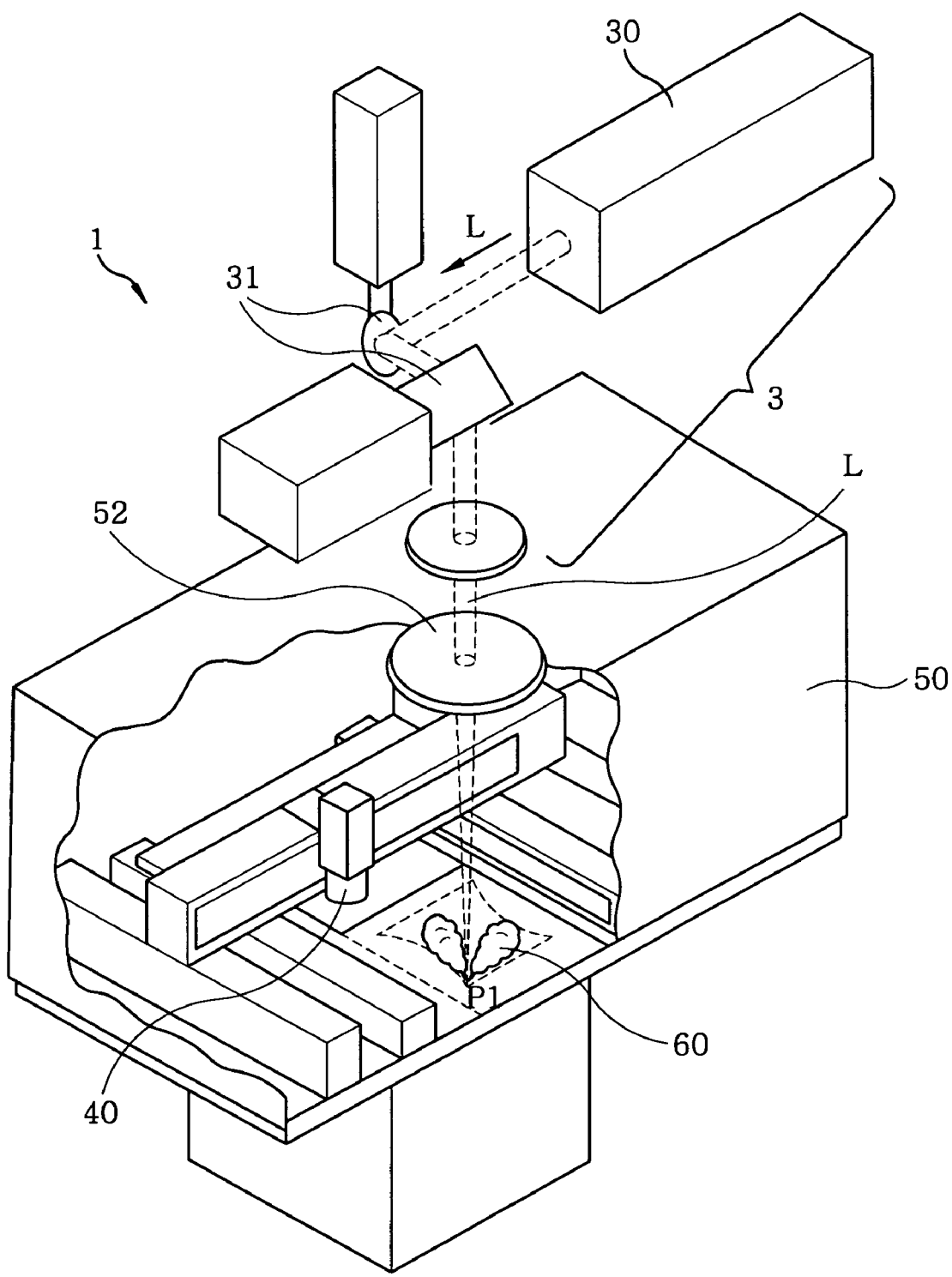
FIG. 1 is a perspective view schematically depicting a state that fumes are generated within a chamber by the irradiation of a light beam.

The present production method has been conceived from the evacuation of a chamber in the afore-mentioned Selective Laser Sintering or Melting. In other words, the present invention is characterized in that ambient gas existing within a chamber 50 is exhausted as shown in FIG. 1. Examples of the ambient gas include inert gases such as nitrogen gas and the like.

Figure 5:
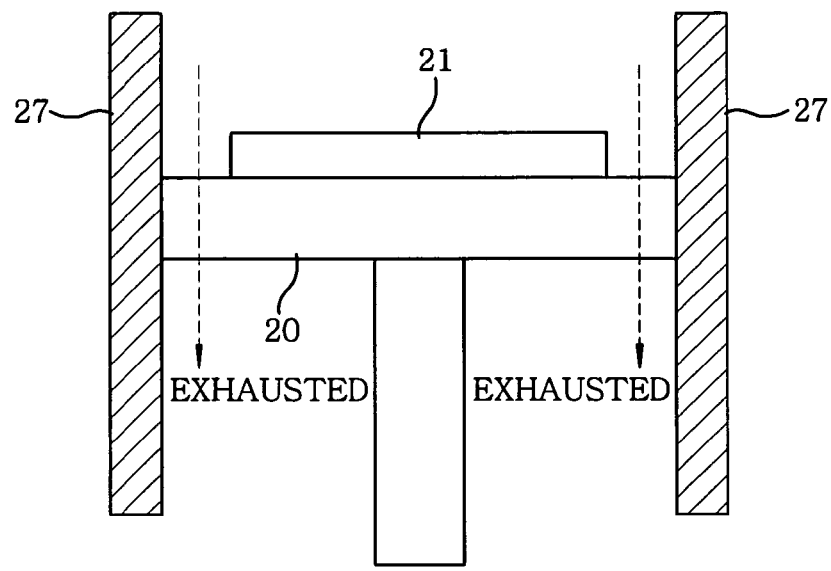
FIG. 5 is a schematic view conceptually illustrating the features of the present invention.
Figure 6:
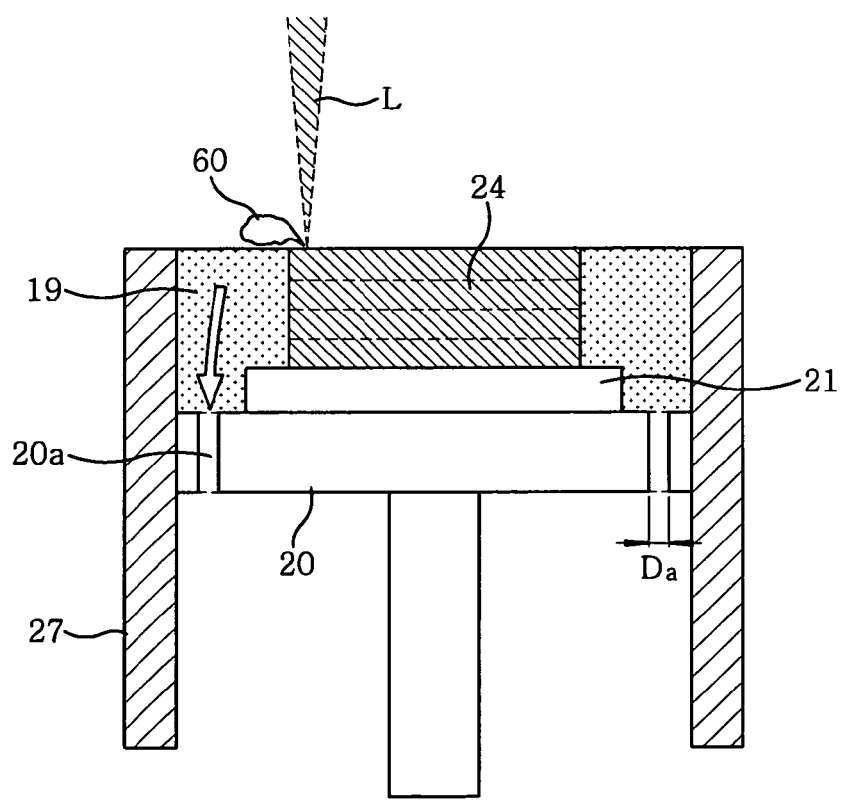
FIG. 6 is a section view schematically showing an example in which gas passages are formed in a shaping table.

In the production method of the present invention, at least a part of the ambient gas existing within the chamber is exhausted downwards through the shaping table as can be seen in FIG. 5. Fumes can be discharged out of the chamber together with the ambient gas thus exhausted. As a specific example, it may be considered that gas passages 20a (e.g., opening portions) are formed in the region of the shaping table around the substrate 21 as shown in FIG. 6. In this case, the fumes generated can be discharged downwards out of the chamber through a powder layer 19.

When the ambient gas is exhausted through the gas passages in the above-noted manner, it may be possible to operate a suction unit, e.g., a suction pump, provided with respect to the gas passages (more specifically, a suction pump in a pipeline connected to the gas passages). Alternatively, the ambient gas may be discharged from the gas passages using a pressure difference generated when keeping the pressure within the chamber greater than the pressure outside the chamber (e.g., the atmospheric pressure).

The flow rate of the ambient gas discharged from the chamber depends on the quantity of the fumes generated and may be, e.g., about 5 to 100 SLM (where the SLM denotes a unit by which the quantity of a gas discharged for one minute in a standard gas state is expressed in terms of liters). It is preferred that the ambient gas is continuously exhausted in order to remove the fumes as completely as possible. If necessary, however, the evacuation may be performed for a specified period of time. In other words, the evacuation of the ambient gas may be performed intermittently. In this case, it is preferred that the evacuation of the ambient gas is performed depending on the quantity of the fumes generated. For example, it is preferred that the quantity and concentration of the fumes is detected by taking the image of an irradiation target P1 (see FIG. 1) with a camera. Parameters such as the brightness of the irradiation target taken by the camera and the like are changed as the fume concentration in the ambient gas grows higher. Using these parameters, it is possible to determine the timing at which the evacuation of the ambient gas is performed.

Although the size of the gas passages depends on the size of the chamber, the quantity of the fumes, the size of the shaped object and so forth, each of the gas passages may have an aperture diameter Da of, e.g., about 1 to 30 mm (see FIG. 6). The number of the gas passages also depends on the size of the chamber, the quantity of the fumes, the size of the shaped object and so forth, and may be, e.g., 1 to 20. This holds true in case of the gas passages of the substrate and the solidified layer and in case of the porous portion of the solidified layer, which will be described later. The cross-sectional shape of each of the gas passages (more specifically, the cross-sectional shape of each of the gas passages taken along the horizontal direction) may be, but is not particularly limited to, a circular shape, an elliptical shape, a polygonal shape or other shapes.

The gas passages of the shaping table may be formed in advance of practicing the present invention by a suitable method such as drilling or laser processing. This holds true in case of the gas passages of the substrate which will be described later. A unit (e.g., a filter) that allows only a gaseous material to pass therethrough but prevents a solid material from passing therethrough may be provided in the gas passages so that the powder contained in a shaping tank (namely, a non-sintered metal powder layer or an uncured resin powder layer) should not be dropped or sucked through the gas passages.

The ambient gas thus exhausted (particularly, the ambient gas containing fumes) may be returned back into the chamber after going through a dust collection processing. This makes it possible to continuously perform the operation of supplying and exhausting the ambient gas to and from the chamber. In case where the continuous operation is performed in this manner, use is made of a dust collection device and a pump installed in a circulation passageway.

It may be considered to employ many other examples in which at least a part of the ambient gas is exhausted downwards through the shaping tank. These other examples will be described herein below. The following description is directed to an instance where a metal powder is used as the powder (namely, a metal powder layer is used as the powder layer) and the solidified layer is a sintered layer.

(Evacuation Through the Gas Passages of the Substrate)

Figure 7:
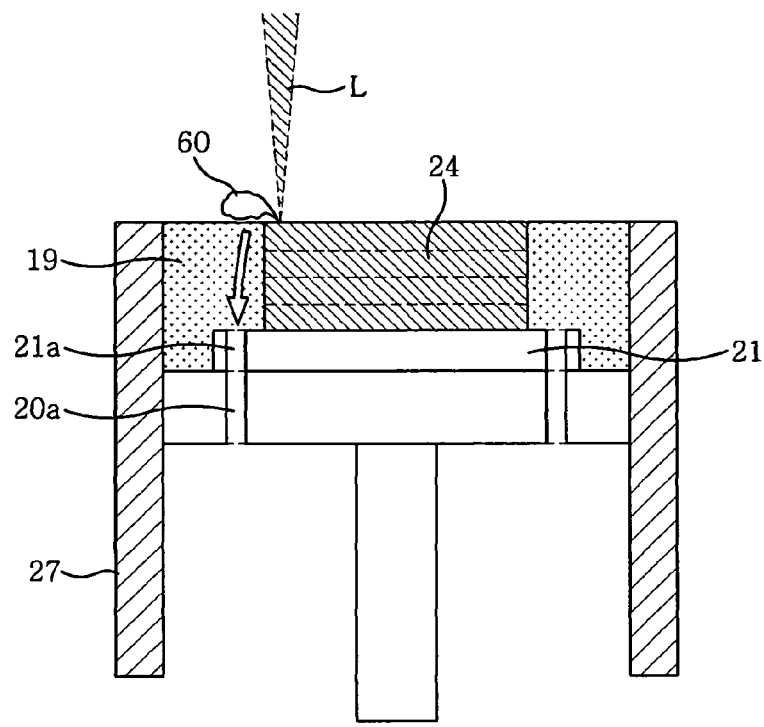
FIG. 7 is a section view schematically showing an example in which gas passages are formed in the shaping table and a substrate.

FIG. 7 shows an example in which evacuation is performed through the gas passages of the substrate. As shown, there are formed gas passages 21a (e.g., opening portions) in the substrate 21, in addition to the gas passages 20a formed in the shaping table 20. In this example, the gas passages 20a of the shaping table 20 and the gas passages 21a of the substrate 21 are in fluid communication with each other. This means that the gas passages 20a of the shaping table 20 are essentially formed in the region of the shaping table 20 over which the substrate 21 is placed. In this example, the fumes 60 generated in the irradiation point of the light beam L is discharged out of the chamber through the metal powder layer 19, the gas passages 21a of the substrate 21 and the gas passages 20a of the shaping table 20. This provides an advantage in that the ambient gas can be discharged from the region over which the substrate 21 is arranged, thereby making it possible to suck and remove the fumes in a position near the fume generation point. That is, the fumes can be removed from the chamber in an effective manner.

(Evacuation Through the Gas Passages of the Substrate and the Sintered Layer)

Figure 8:
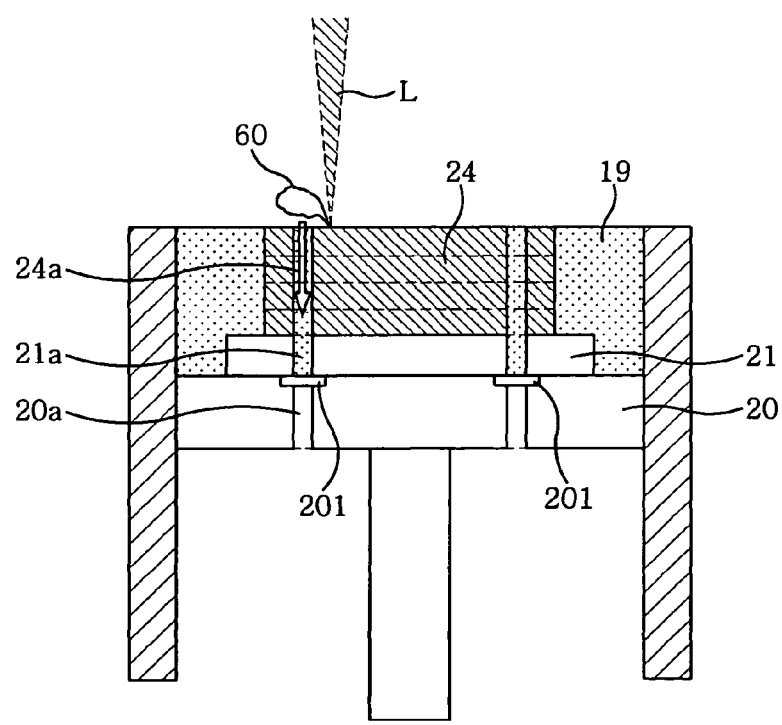
FIG. 8 is a section view schematically showing an example in which gas passages are formed in the shaping table, the substrate and a sintered layer.

FIG. 8 shows an example in which evacuation is performed through the gas passages of the substrate and the sintered layer. As shown, there are formed gas passages 24a (e.g., opening portions) in the sintered layers 24, i.e., in the region of the shaped object, in addition to the gas passages 20a and 21a formed in the shaping table 20 and the substrate 21. In this example, the gas passages 20a of the shaping table 20, the gas passages 21a of the substrate 21 and the gas passages 24a of the sintered layers 24 are in fluid communication with one another. This means that the gas passages 20a of the shaping table 20 are formed in the region of the shaping table 20 over which the substrate 21 is placed and that the gas passages 24a of the sintered layers 24 are formed in alignment with the gas passages 20a and 21a of the shaping table 20 and the substrate 21. The gas passages 24a of the sintered layers 24 can be formed by controlling the light beam irradiated on the metal powder layer. For example, the gas passages 24a can be formed by not irradiating the light beam on the powder layer region corresponding to the gas passages 24a but by irradiating the light beam on the remaining region and sintering the metal powder. In the example shown in FIG. 8, the fumes 60 are discharged downwards out of the chamber through the gas passages 24a of the sintered layers 24, the gas passages 21a of the substrate 21 and the gas passages 20a of the shaping table 20. This provides an advantage in that the ambient gas can be discharged from the surface of the metal powder layer or the sintered layer, thereby making it possible to remove the fumes from the chamber in an effective manner. In particular, the ambient gas can be exhausted from the region just near the fume generation point, which makes it possible to rapidly remove the fumes before they are diffused upwards.

In this case, filters 201 that allow only a gaseous material to pass therethrough but prevent a solid material from passing therethrough are provided in the gas passages 20a so that the non-sintered powder should not be dropped or sucked through the gas passages 20a.

Figure 9A:
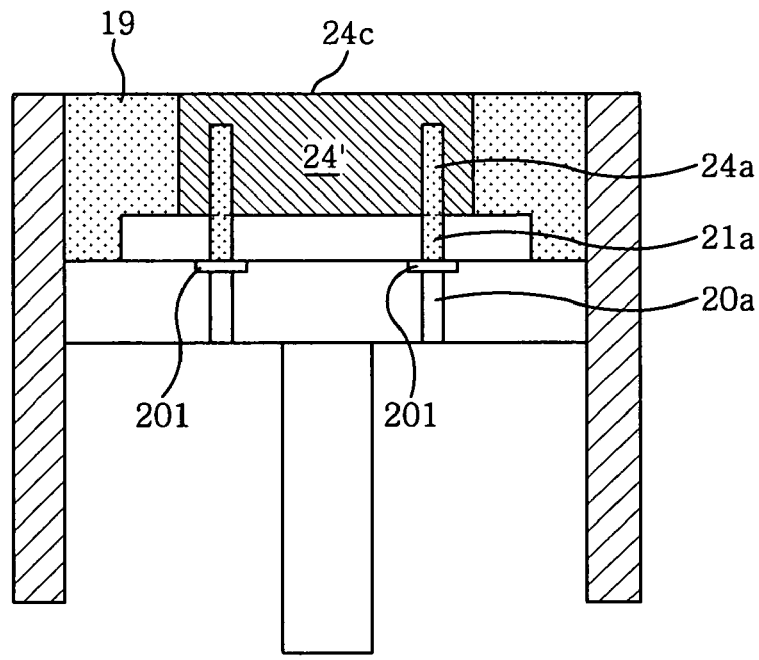
FIG. 9A is a section view schematically showing an example in which the gas passages are closed near the surface of a shaped object.

It is preferred that the gas passages 24a of the sintered layers 24 are finally closed as shown in FIG. 9A so that they should not appear on the surface 24c of the shaped object. This makes it possible to suitably use the shaped object 24' as a mold. In the event that the gas passages 24a are used as holes for receiving KO pins or knockout pins, there is no need to close the gas passages 24a. In other words, the gas passages 24a may appear on the surface 24c of the shaped object.

Figure 9B:
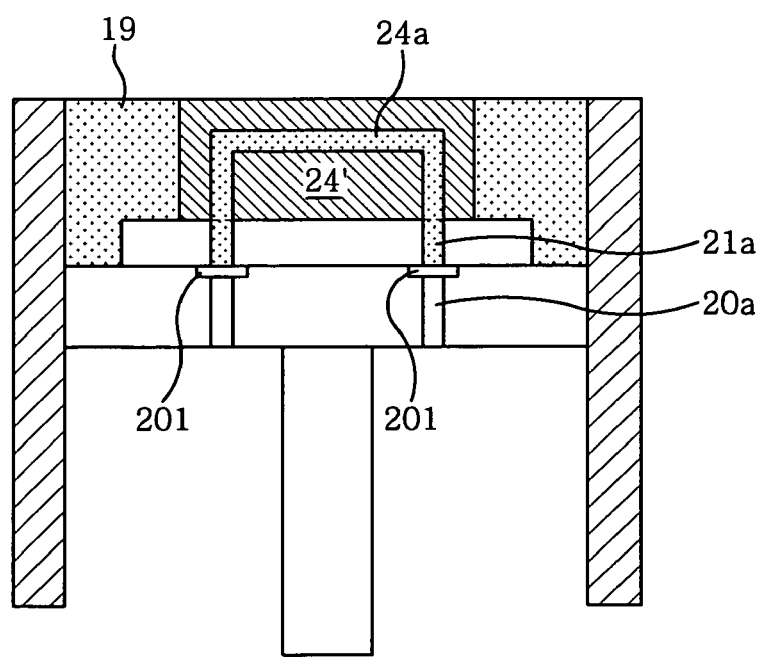
FIG. 9B is a section view schematically showing an example in which the gas passages of the shaped object are used as a coolant passage of a mold.

As shown in FIG. 9B, the gas passages 24a of the shaped object 24' may be used as a coolant passage (e.g., a mold temperature controlling water pipe). In other words, the gas passages of the sintered layers may be used as a passageway of the ambient gas (fumes) during the course of producing the shaped object and as a coolant passageway after production of the shaped object. This makes it possible to attain a desired effect during the course of producing the shaped object and after production of the shaped object.

(Evacuation Through Porous Portions of Sintered Layer)

Figure 10A:
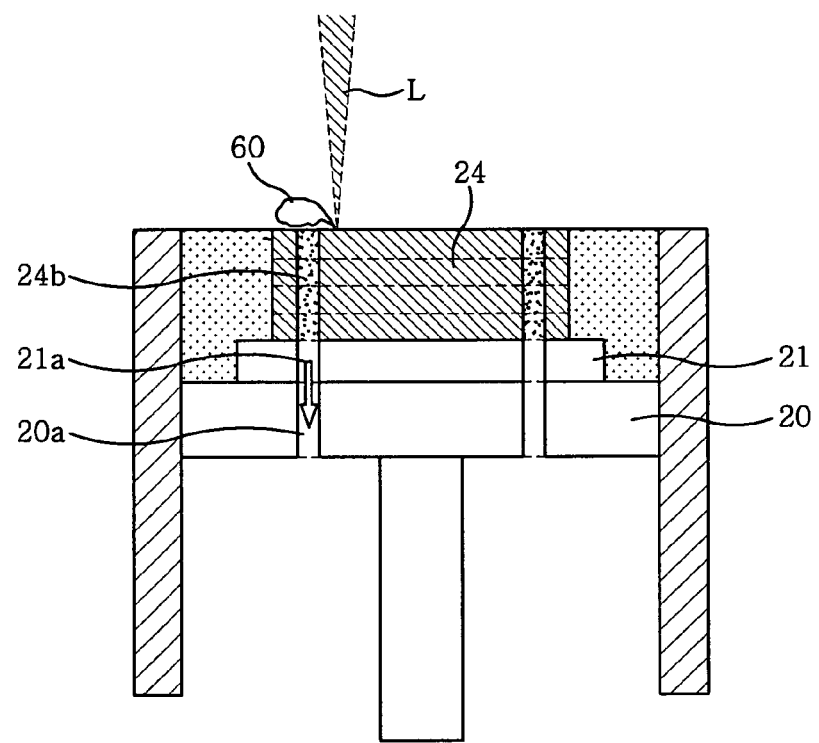
FIG. 10A is a section view schematically showing an example in which a gas is exhausted through porous portions of the sintered layer.

This is directed to an example in which, as shown in FIG. 10A, the ambient gas existing in the chamber is exhausted through porous portions 24b of the sintered layers 24. As shown, the porous portions 24b of the sintered layers 24 remain in fluid communication with the gas passages 20a of the shaping table 20 and the gas passages 21a of the substrate 21. The porous portions 24b (namely, the coarse sintered portion) of the sintered layers 24 can be formed by controlling the irradiation conditions of the light beam L. For example, a light beam with low output energy is irradiated on the powder layer region corresponding to the porous portions 24b to thereby reduce the sintering density (to, e.g., about 40% through about 90%) in that region. A light beam with specified intensity is irradiated on the remaining region to form a sintered portion. The porous portions 24b can be formed not only by (a) reducing the output energy of the light beam but also by (b) increasing the scanning speed of the light beam, (c) widening the scanning pitch of the light beam or (d) increasing the collecting diameter of the light beam. The techniques (a) through (d) may be performed independently or in combination. In case of the technique (a), the sintering density can be made equal to about 70 to 80% by irradiating a light beam whose energy density is about 2 to 3 J/mm$^2$. In the example in which the porous portions of the sintered layers are formed, the fumes 60 are discharged out of the chamber through the porous portions 24b of the sintered layers 24, the gas passages 21a of the substrate 21 and the gas passages 20a of the shaping table 20. This provides an advantage in that the ambient gas can be discharged from the surface of the metal powder layer or the sintered layer (the porous portions), thereby making it possible to remove the fumes from the chamber in an effective manner. In particular, the ambient gas can be rapidly exhausted from the region just near the fume generation point, which makes it possible to remove the fumes before they are diffused upwards. Another advantage lies in that the porous portions of the sintered layers 24 serve to prevent non-sintered powder from falling down. In case where the porous portions 24b of the sintered layers 24 shown in FIG. 10A exists in the shaped object, the object thus obtained can be advantageously used as a mold. More specifically, it is typical that there occurs insufficient filling of a resin if the air existing in a cavity and the gas generated in the cavity are not escaped when injecting a molten resin into a mold. Additionally, the air and gas under pressure is abnormally heated, consequently burning a resin-molded object. In case where the shaped object shown in FIG. 10A is used as a mold, the porous portions 24b of the sintered layers 24 serve as gas escaping routes. This makes it possible to obtain a desired resin-molded object.

Figure 10B:
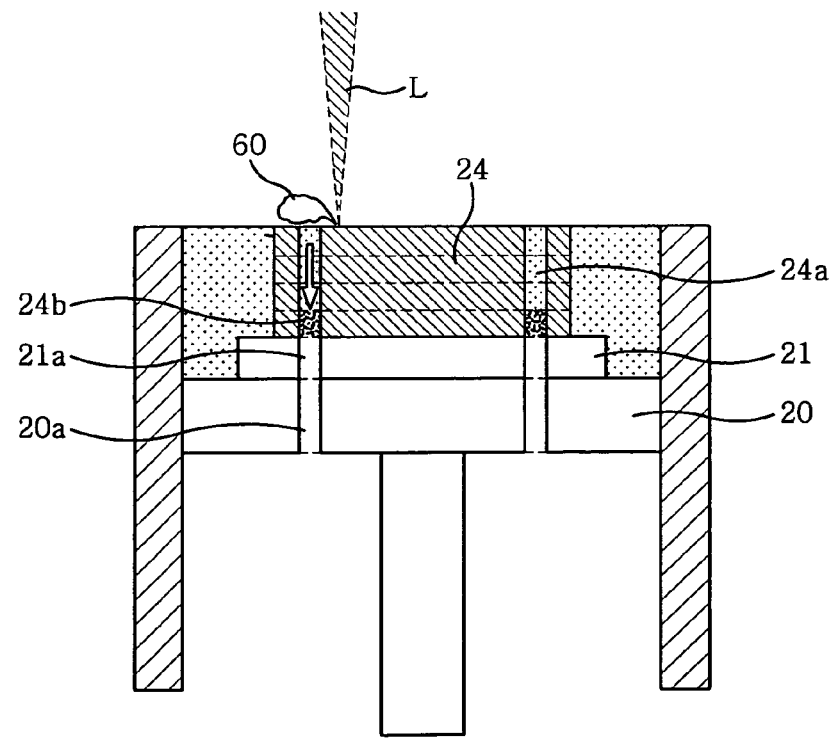
FIG. 10B is a section view schematically showing an example in which porous portions of the solidified layers are locally formed to provide plugs in the gas passages of the substrate.

From the standpoint of prevention of dropping of the metal powder, the porous portions 24b of the sintered layer 24 may be formed into a shape as shown in FIG. 10B. In other words, the porous portions 24b of the sintered layer 24 may be locally formed to provide plugs in the gas passages 21a of the substrate 21. This makes it possible to reliably prevent dropping of the metal powder supplied to above the porous portions.

Figure 11A:
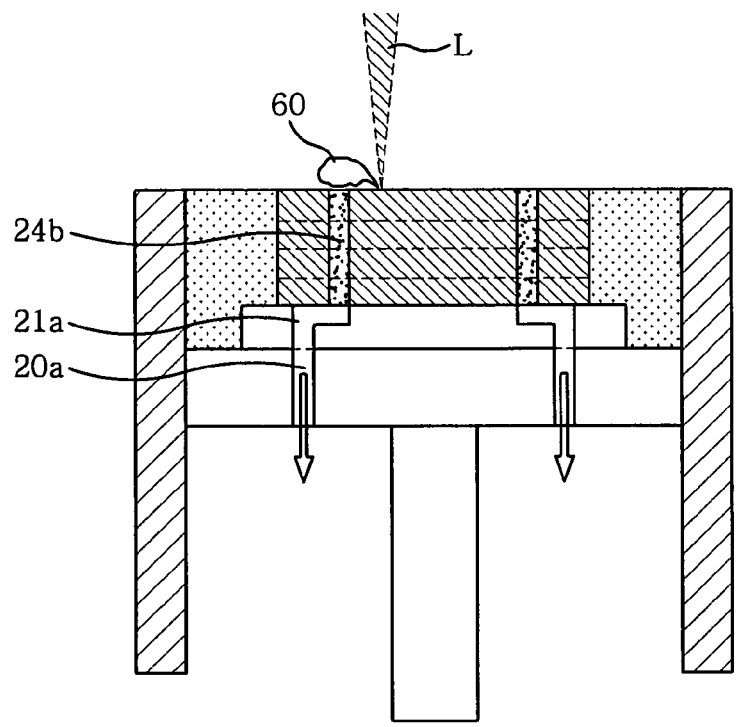
FIGS. 11A through 11C are section views schematically showing different examples in which a gas is exhausted through porous portions of the sintered layers.
Figure 11B:
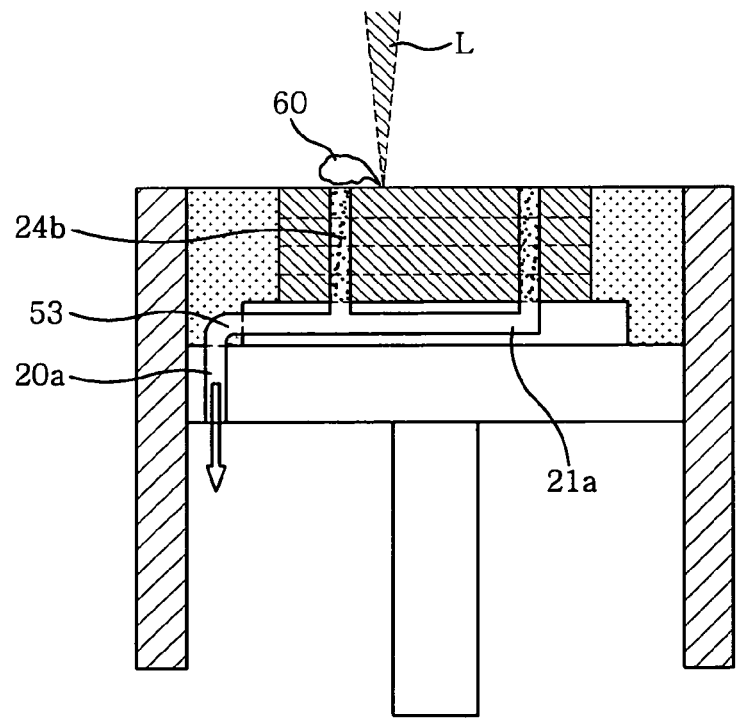
Figure 11C:
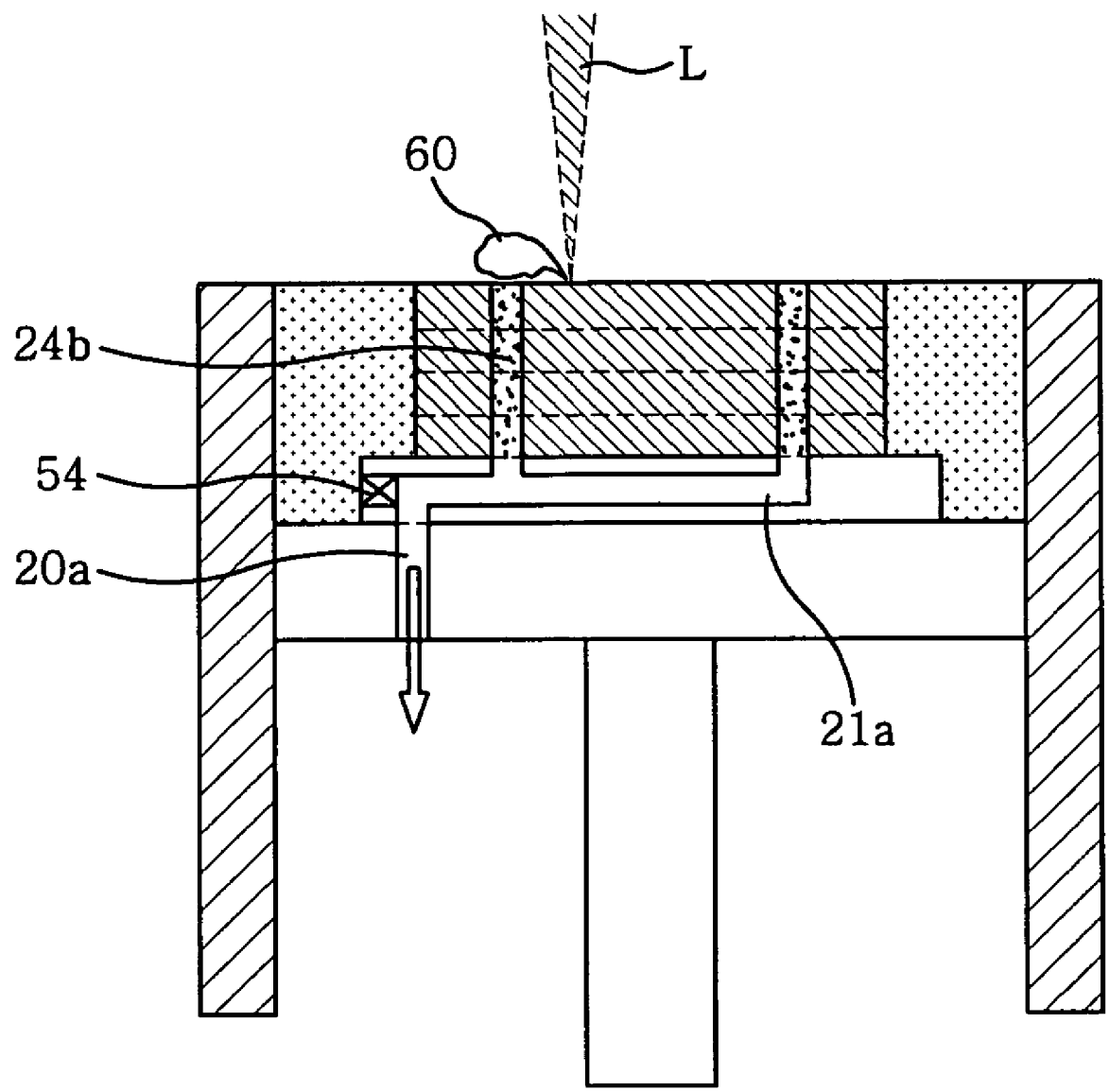

It may be considered to employ many other examples in which evacuation is performed through the porous portions of the sintered layers 24. For instance, it is conceivable to use the examples shown in FIGS. 11A through 11C. FIG. 11A shows an example in which the gas passages 21a of the substrate 21 lying below the porous portions 24b of the sintered layers 24 are formed into a curved shape. In the illustrated example, the gas passages 21a of curved shape can reliably prevent the metal powder from dropping downwards. FIGS. 11B and 11C are directed to examples in which the gas passages 21a of the substrate 21 remaining in fluid communication with the porous portions 24b of the sintered layers are connected to each other so as to provide a single passageway. Thus, the gas passages 21a of the substrate 21 leading to the shaping table 20 can be consolidated into a single passageway regardless of the number and position of the porous portions 24b of the sintered layers 24. In other words, the position and/or number of the porous portions 24b can be arbitrarily and freely set by merely changing the shape of the gas passages of the substrate. In the example shown in FIG. 11B, the gas passage 21a of the substrate 21 and the gas passage 20a of the shaping table 20 are interconnected by a tube 53. The ambient gas is sucked and removed from the region of the shaping table 20 over which the substrate 21 is not placed. In the example shown in FIG. 11C, the ambient gas is sucked and removed from the region of the shaping table 20 over which the substrate 21 is placed. (As shown, the evacuation route can be changed by providing, e.g., a plug member 54 to the gas passage 21a of the substrate 21.) As can be seen in FIGS. 11B and 11C, the ambient gas can be exhausted from a desired point depending on the type of the gas passage of the substrate.

(Evacuation in Combination with Gas Supply)

Figure 12A:
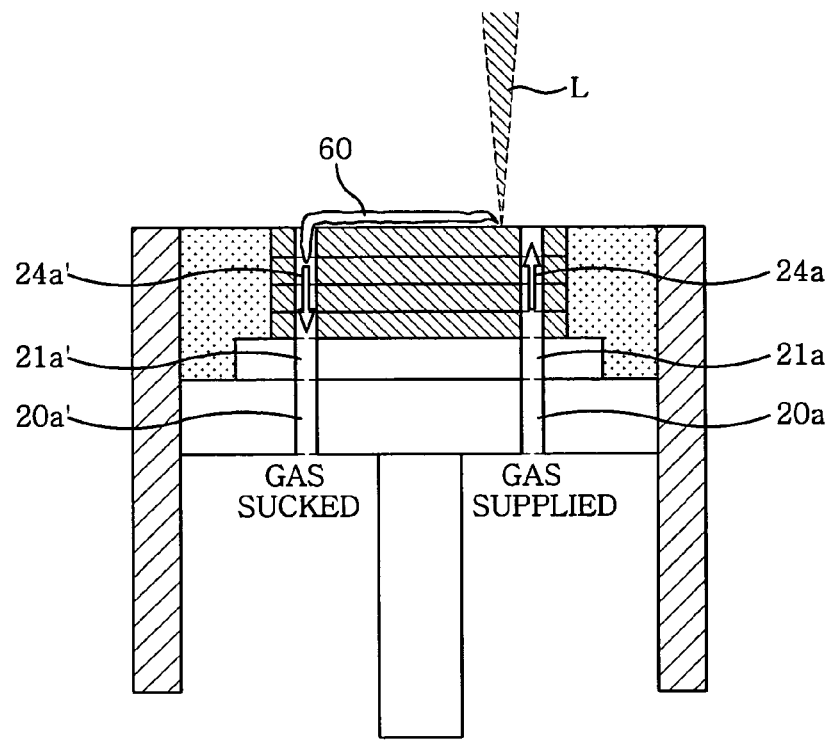
FIGS. 12A and 12B are section views schematically showing an example in which a gas is supplied into the chamber in the vicinity of the sintered layer.
Figure 12B:
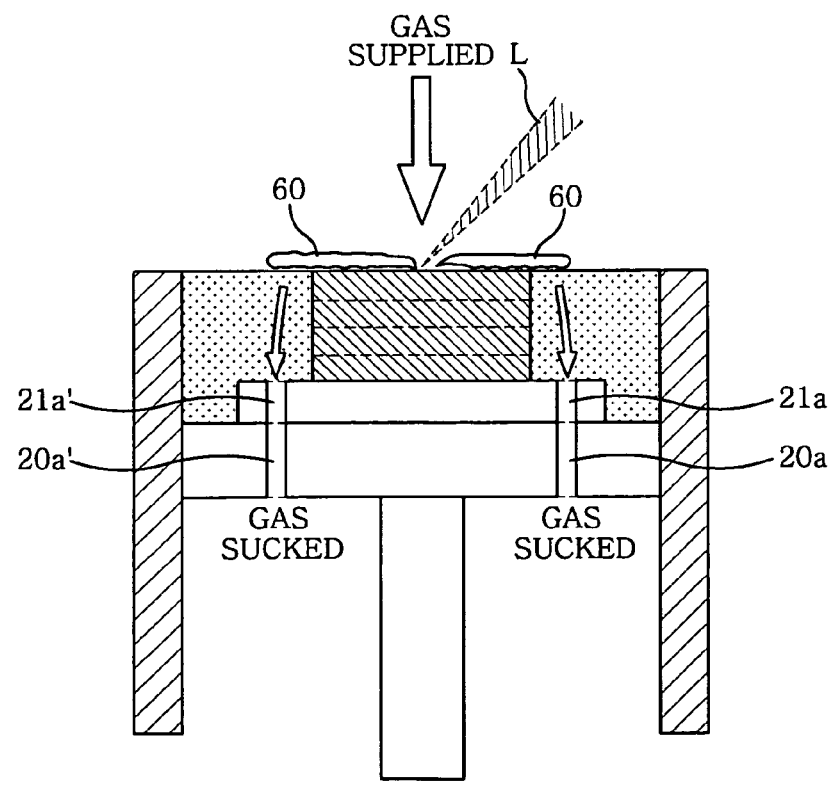

FIGS. 12A and 12B are directed to examples in which the supply of gas into the chamber is performed near the sintered layers so that the fumes 60 can be reliably guided to the gas passages. As shown, the gas supply is performed to ensure that the fumes 60 are led to the gas passages through a shortest possible distance. This makes it possible to remove the fumes from the chamber while suppressing upward movement of the fumes as far as possible. In the example shown in FIG. 12A, the ambient gas is supplied through the gas passages 20a, 21a and 24a formed at one side and the ambient gas containing fumes is sucked and removed through the gas passages 20a', 21a' and 24a' formed at the other side. If the supply of gas and the suction removal thereof are performed continuously in this manner, an inert gas flows near the surface of the metal powder layer and/or the sintered layer at all times. This creates what is called an inert shield. As a result, it becomes possible to effectively prevent oxidization of the sintered layer, thus providing an effect of improving the quality of a shaped object.

(Production Apparatus of the Present Invention)

Next, description will be made on an apparatus suitable for performing the production method of the present invention.

(Description will be made on one example of the apparatus in which a metal powder is used as the powder and the solidified layer is a sintered layer.)

Figure 13:
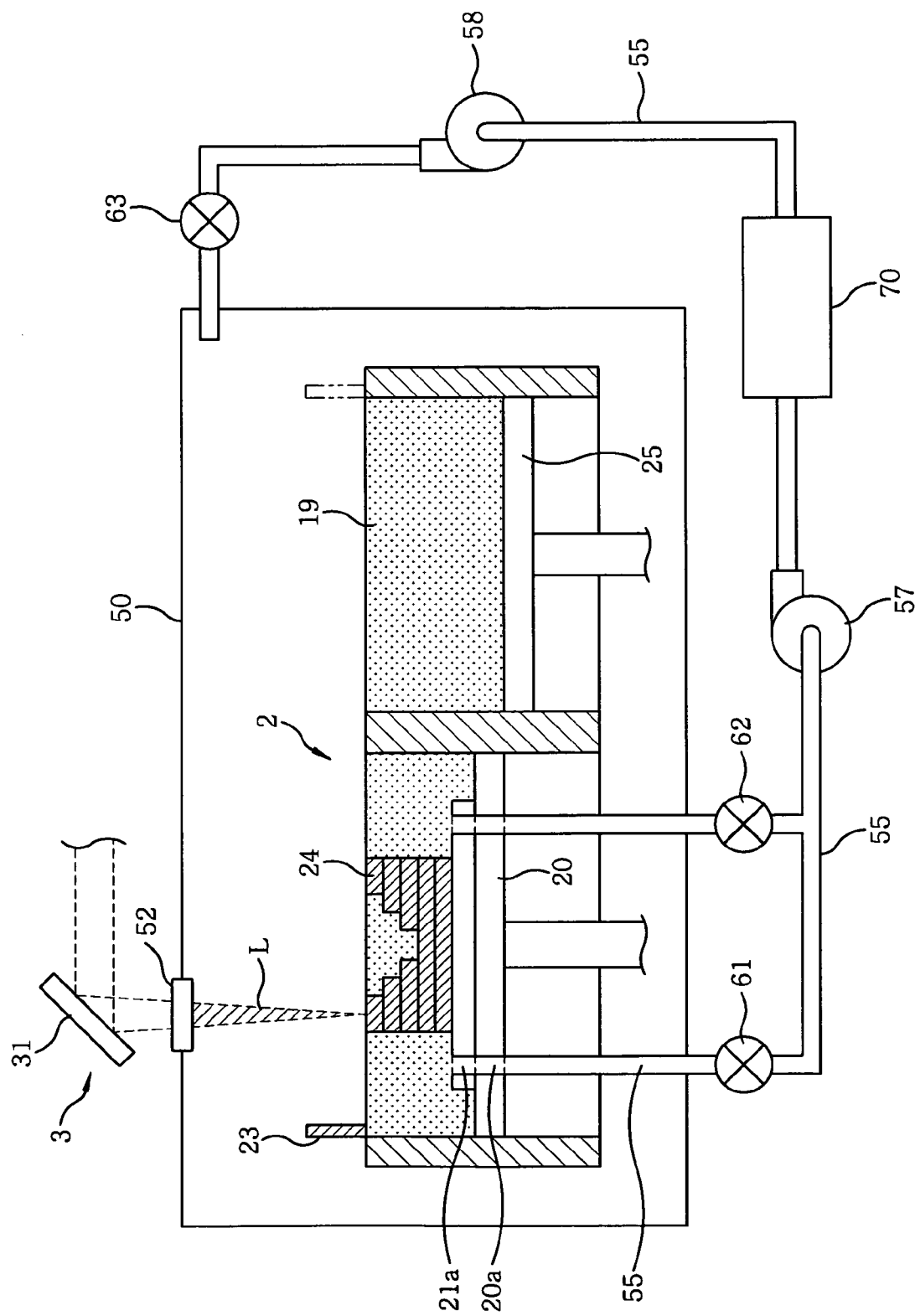
FIG. 13 is a schematic view showing the overall configuration of a production apparatus in accordance with the present invention.

As shown in FIGS. 1, 2 and 13, the present apparatus includes a powder layer forming unit 2 for forming a metal powder layer, a light beam irradiation unit 3 for irradiating a light beam L on a specified portion of the metal powder layer 22 to form a sintered layer, a shaping table 20 on which the metal powder layer and/or the solidified layer are formed, and a chamber 50 for accommodating the powder layer forming unit 2 and the shaping table 20 therein. The shaping table 20 is provided with gas passages 20a through which to discharge or supply an ambient gas from and to the chamber 50. The gas passages 20a are connected to a suction pump 57 or a feed pump 58 through a pipeline 55. In this production apparatus, the gas passages 20a of the shaping table 20 are connected to the suction pump 57 (e.g., an exhaust fan) as can be seen in FIG. 13. Thus, at least a part of the ambient gas existing within the chamber 50 can be exhausted downwards through the shaping table 20. Since the powder layer forming unit 2, the shaping table 20, the light beam irradiation unit 3 and the chamber 50, as well as the operation of the present production apparatus, have already been described in connection with the Selective Laser Sintering or Melting, no description will be made in that regard to avoid redundancy.

In an example in which the substrate 21 is provided on the shaping table 20, the gas passages 21a through which to discharge and supply an ambient gas from and to the chamber 50 are formed in the substrate 21. In this case, the gas passages 20a of the shaping table 20 and the gas passages 21a of the substrate 21 stay in fluid communication with each other (see, e.g., FIGS. 7 and 13).

Preferably, a dust collection device 70 is provided in the pipeline 55 connected to the gas passages 20a of the shaping table 20 (see FIG. 13). This makes it possible to return the discharged ambient gas back to the chamber 50 after subjecting it to a dust collection processing. By carrying out gas purification such as dust collection or the like, it becomes possible to continuously perform the gas supply and discharge operation and to continuously remove the fumes from the chamber. The dust collection device 70 may include, e.g., a filter serving to prevent the fumes (and the metal powder scattered and discharged) from passing therethrough. Any type of filter may be used insofar as it is capable of catching the fumes and the metal powder. For example, a labyrinth type filter may be used. Alternatively, dust collection may be performed by use of a centrifugal force (In other words, it may be possible to use a centrifugal dust collector such as a cyclone separator or the like). In case where the powder is a metal one, the fumes may contain a metal vapor. In this case, the dust collection may be performed using a dust collection unit such as a magnet or the like.

While certain embodiments of the present invention have been described hereinabove, they are nothing more than illustration of typical examples falling within the scope of the present invention. Therefore, the present invention shall not be limited to the foregoing embodiments. It will be apparent to those skilled in the art that many changes or modifications may be made without departing from the scope of the invention.

For example, although the description made hereinabove is primarily directed to an arrangement in which the gas passages are formed in the shaping table 20 (see FIG. 6), the present invention shall not be limited to this arrangement. As an alternative example, the wall portion of the shaping tank (the portion designated by reference numeral "27" in FIG. 6) may be provided with gas passages through which to discharge the ambient gas from the chamber.

Although the foregoing description is primarily directed to an example in which the powder layer is a metal powder layer and the solidified layer is a sintered layer, it will be readily understood by those skilled in the art that the same features and effects are provided even if the powder layer is a resin powder layer and the solidified layer is a cured layer.

Industrial Applicability

Various kinds of objects can be produced by performing the present method for producing a three-dimensionally shaped object. For example, in case where the powder layer is a metal powder layer and the solidified layer is a sintered layer, the three-dimensionally shaped object thus obtained can be used as a mold such as a mold for the injection molding of plastics, a press mold, a die-casting mold, a casting mold, a forging mold or the like. In case where the powder layer is a resin powder layer and the solidified layer is a cured layer, the three-dimensionally shaped object thus obtained can be used as a resin-molded article.

What is claimed is:

1. A method for producing a three-dimensionally shaped object, comprising the steps of:
   (i) forming a solidified layer by irradiating a light beam on a specified portion of a powder layer placed on a shaping table to sinter or melt the specified portion;
   (ii) forming another solidified layer by placing a new powder layer on the solidified layer thus obtained, and irradiating the light beam on a specified portion of the new powder layer to sinter or melt the specified portion of the new powder layer; and
   (iii) repeating the step (ii) to produce a three-dimensionally shaped object,
   wherein, the powder layer and/or the solidified layer are formed on a substrate provided on the shaping table, and
   when performing the steps (i) to (iii) within a chamber, at least a part of an ambient gas in the chamber is removed from the chamber through a gas passage of the solidified layer, a gas passage of the substrate and a gas passage of the shaping table, and exhausted from the chamber through a gas passage of a shaping tank.

2. The method of claim 1, wherein, by the exhaust of the ambient gas, at least a part of fumes generated by the irradiation of the light beam is removed from the chamber through the gas passage of the shaping tank.

3. The method of claim 1, wherein the solidified layer includes a porous sintered portion, and at least a part of the ambient gas is removed from the chamber through the porous sintered portion of the solidified layer, the gas passage of the substrate and the gas passage of the shaping table, and exhausted from the chamber through the gas passage of the shaping tank.

4. The method of claim 3, wherein the porous sintered portion is locally formed in the gas passage of the solidified layer.

5. The method of claim 1, wherein the number of the gas passage of the substrate is two or more, and a gas is supplied into the chamber through one of the gas passages while at least a part of the ambient gas is exhausted through the other.

6. The method of claim 1, wherein the exhausted ambient gas is subjected to dust collection processing and then returned into the chamber.

* * * * *